(No Model.) 2 Sheets—Sheet 1.
R. H. PLASS.
LAMP.
No. 477,698. Patented June 28, 1892.
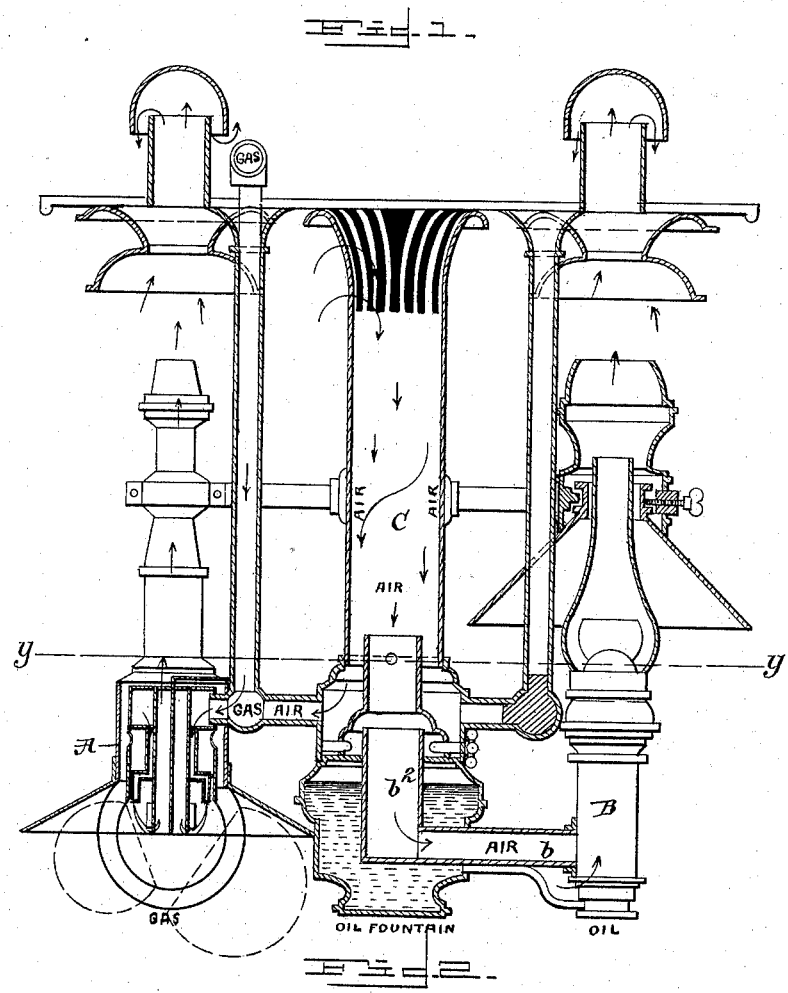
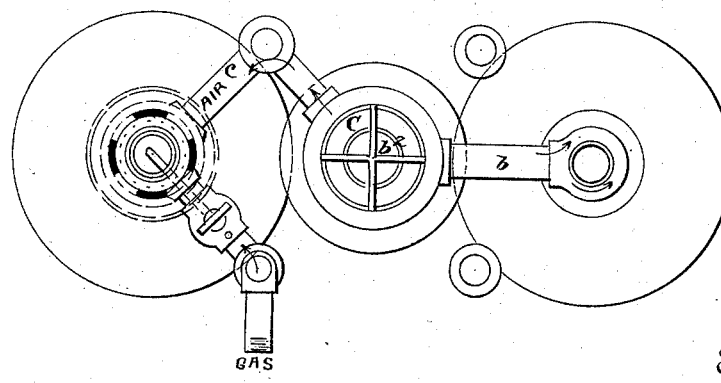
Witnesses
N. H. Humphrey.
David H. Mead.
Inventor
Reuben H. Plass.
by R. S. Dyrenforth
his Attorney.

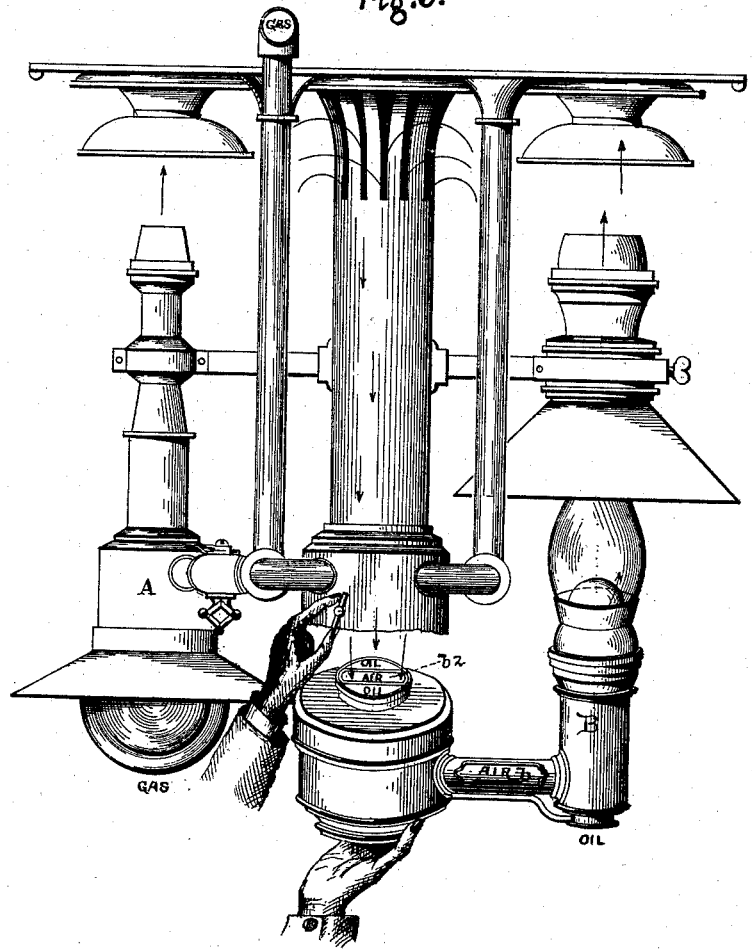

UNITED STATES PATENT OFFICE.

REUBEN H. PLASS, OF BROOKLYN, NEW YORK.

LAMP.

SPECIFICATION forming part of Letters Patent No. 477,698, dated June 28, 1892.

Application filed September 11, 1889. Serial No. 323,694. (No model.)

*To all whom it may concern:*

Be it known that I, REUBEN H. PLASS, a citizen of the United States, residing at Brooklyn, in the county of Kings and State of New York, have invented certain new and useful Improvements in Lamps; and I do hereby declare the following to be a full, clear, and exact description of the invention, such as will enable others skilled in the art to which it appertains to make and use the same.

This invention relates to lamps.

The object is, where the source of supply to a lamp is at a distance and the conditions of uninterrupted burning are uncertain from any intervening cause, as where regenerative gas-lamps are employed, to supply an auxiliary lamp with source of supply in immediate juxtaposition and the auxiliary lamp conveniently arranged with the gas-lamp, whereby should the gas-lamp become extinguished from any of the numerous causes from which they have heretofore often been extinguished a new light may readily be supplied from a resource immediately at hand.

With this object in view the invention consists in the combination, in the same fixture, with a regenerative gas-lamp, of a closed oil-lamp, there being a common air-supply duct leading from the top of the apartment in which the fixture is located to both the regenerative gas-lamp and the oil-lamp, the oil-lamp being closed to admission of air except by the common duct.

In the accompanying drawings, forming part of this specification, and in which like letters of reference indicate corresponding parts, Figure 1 is a vertical longitudinal section of a combined regenerative gas-lamp and oil-lamp fixture, illustrating my invention, showing a suitable regenerative gas-lamp, a closed oil-lamp, so that the lamp cannot be extinguished by any sudden draft, and a common air-supply pipe leading to the regenerative gas-lamp and to the lower part of the oil-lamp from a protected situation from the top of the apartment in which the fixture is located. Fig. 2 is a plan view taken on the line $y\ y$ of Fig. 1, showing the relative position of the air and gas supplies to the regenerative gas-lamp; and Fig. 3 is a view in elevation of a combined regenerative gas-lamp and oil-lamp fixture, showing an air-conduit to the oil-lamp leading from the common air-duct, with oil openings on each side to replenish the oil-reservoir, and means for removing the oil-lamp portion from the fixture.

As is well known, there is some feeling of uncertainty, whether just or unjust, in the employment of regenerative gas-lamps in railway-cars, in that it is feared that from interruption in the supply of gas or failure of conditions requisite in the air-supply the light may become extinguished and the apartment be left in darkness for some time. To make it possible to establish a light immediately, should the regenerative gas-lamp from any cause become extinguished, I combine with it and as a part of its fixture an oil-lamp inextinguishable from drafts or the like, so rendered by supply to it of air from the same source and almost wholly by the same means from and by which air is supplied to the regenerative gas-lamp—that is to say, by an air-duct opening from the top of the apartment in which the fixture is located, a place least likely to be subjected to impulses or sudden drafts of air, and leading to a supply-conduit for the oil-lamp, as well as to the regenerative gas-lamp.

In the drawings, A indicates a regenerative gas-lamp, and B an oil-lamp closed below, excepting where an air-pipe $b$ leads to it, so that no draft in or about the lamp proper will affect the light, there being an air-conduit $b^2$, from which the air-pipe $b$ leads. This air-conduit is located in a large air-duct C, which extends from the top of the apartment in which the fixture is located and connects directly with an air-pipe $c$, passing into the regenerative gas-lamp. By this arrangement an efficient, convenient, and compact fixture is made, and by the same means the same conditions as to regularity, uniformity, and adequate quantity of air-supply to the regenerative gas-lamp are established for the oil-lamp without additional construction of different location. The fixture may be made to present a very similar appearance of the two lamps. It is to be understood that a fixture may have more than one gas-lamp with one or more oil-lamps. The oil-lamp part of the fixture will be attached at the common air-duct which is centrally located and may be readily removed by hand, as shown in Fig. 3. After removal the lower part of the duct may be closed by a suitable valve or plug.

Having thus fully described my invention, what I claim as new, and desire to secure by Letters Patent, is—

The combination, in the same fixture with a regenerative gas-lamp, of an oil-lamp, there being a common air-supply duct leading from the top of the apartment in which the fixture is located to both the regenerative gas-lamp and the oil-lamp, the oil-lamp being closed to admission of air, except by the common duct, substantially as described.

In testimony whereof I affix my signature in presence of two witnesses.

REUBEN H. PLASS.

Witnesses:
R. G. DYRENFORTH,
JOSEPH H. HANNEN.